United States Patent [19]

Poulsen

[11] Patent Number: 4,521,676
[45] Date of Patent: Jun. 4, 1985

[54] ENCODED CAP FOR A PRESSURIZED GAS CYLINDER

[75] Inventor: Bo Poulsen, Copenhagen, Denmark
[73] Assignee: AGA AB, Cleveland, Ohio
[21] Appl. No.: 428,633
[22] Filed: Sep. 30, 1982
[51] Int. Cl.³ .............................................. G06K 17/00
[52] U.S. Cl. .................................... 235/375; 235/454; 235/458; 235/489; 220/3
[58] Field of Search ...................... 220/3, 1 BC, 85 P; 235/375, 454, 458, 376, 385, 442, 445, 489, 494, 475

[56] References Cited

U.S. PATENT DOCUMENTS

| | | | |
|---|---|---|---|
| 291,769 | 1/1884 | Portillo | 73/714 |
| 2,075,408 | 3/1937 | Sholes | 226/20 |
| 2,343,545 | 3/1944 | Ford et al. | 200/56 |
| 2,421,460 | 6/1947 | Merker et al. | 220/85 P |
| 2,498,401 | 2/1950 | Duncan | 226/116 |
| 2,587,839 | 3/1952 | Grise | 226/66 |
| 2,613,462 | 10/1952 | Johnson | 220/85 P |
| 2,671,590 | 3/1954 | McBean et al. | 141/3 |
| 2,959,023 | 11/1960 | Webster | 62/45 |
| 3,659,428 | 5/1972 | Kunioka et al. | 62/44 |
| 3,680,967 | 8/1972 | Engelhardt | 235/454 |
| 3,831,006 | 8/1974 | Chaffio, III et al. | 235/375 |
| 4,010,623 | 3/1977 | Kaschak | 62/55 |
| 4,053,001 | 10/1977 | Healey et al. | 141/2 |
| 4,105,157 | 8/1978 | Kagaya | 235/475 |
| 4,350,186 | 9/1982 | Schalkowsky et al. | 141/83 |

FOREIGN PATENT DOCUMENTS

| | | |
|---|---|---|
| P264084 | 2/1913 | Fed. Rep. of Germany . |
| 1417235 | 10/1965 | France . |
| 2422901 | 11/1979 | France . |
| 7212223-7 | 3/1974 | Sweden . |
| 2030972 | 4/1980 | United Kingdom . |
| 2077555 | 12/1981 | United Kingdom ................ 235/375 |

OTHER PUBLICATIONS

AGA Gas, Inc., LC Valve Protector Brochure.

Primary Examiner—Harold I. Pitts
Assistant Examiner—Robert Lev
Attorney, Agent, or Firm—David A. Burge

[57] ABSTRACT

A protective cap for a pressurized gas cylinder includes a ferro-magnetic body having an outer surface which is provided with a linear array of holes arranged to encode cylinder data in binary form. The presence or absence of a hole in each of a plurality of linearly spaced positions indicates one of two logic states. While the presence of a hole in a given position indicates one logic state, the absence of a hole at that position indicates the opposite state. Data is encoded in a repetitive but inverse form in two linear side-by-side rows. The data is read by a dual-head inductive transducer which is moved along the linear array such that each of the heads senses the presence or absence of holes in separate ones of the side-by-side rows to generate two separate trains of electrical pulses which are indicative of the encoded data, with one of the trains of pulses being substantially inverse in form from the other of the trains of pulses. The cap structure includes a base which is configured to be rigidly affixed to a neck of a pressurized gas cylinder, and an upstanding part which protectively shrouds a cylinder valve. The upstanding part also forms a yoke which can be engaged by a crane hook for lifting and moving the cylinder. The yoke preferably carries a knob-like projection which extends axially with respect to the cylinder, and which can be grasped to facilitate one's rolling the cylinder to move it manually from place to place.

28 Claims, 6 Drawing Figures

ENCODED CAP FOR A PRESSURIZED GAS CYLINDER

CROSS-REFERENCE TO RELATED APPLICATIONS

Reference is made to the following related, concurrently-filed applications, the disclosures of which are incorporated herein by reference:

FILLING OF ACETYLENE CYLINDERS, Ser. No. 429,490, filed 9/30/82 (concurrently herewith) by Bo Poulsen, hereinafter referred to as the "Filling System Case," and, METHOD AND APPARATUS FOR COOLING SELECTED WALL PORTIONS OF A PRESSURIZED GAS CYLINDER DURING ITS FILLING, Ser. No. 428,905, filed 9/30/82 (concurrently herewith) by Bo Poulsen, hereinafter referred to as the "Cooling System Case."

BACKGROUND OF THE INVENTION

1. Field of the Invention

The present invention relates generally to a protective cap for a pressurized gas cylinder, and more particularly, to a fixed cap having cylinder data encoded thereon. The cap protectively shields a cylinder valve, and facilitates manual and automatic handling of the cylinder.

2. Prior Art

When a pressurized gas cylinder is returned from a customer for refilling, data imprinted, stamped or otherwise encoded on the outer wall of the cylinder must be properly read to permit the cylinder to be properly filled. In the case of an acetylene gas cylinder, the data carried on the outer wall of the cylinder includes the cylinder type (which defines its volume), and "tare weight" of the cylinder, i.e., weight of the cylinder including a porous mass contained within the cylinder, and the nominal charge of acetone solvent which should be present when the cylinder is properly filled. This imprinted or encoded cylinder data must be properly read and taken into account if an acetylene cylinder is to be safely filled.

A problem with previously proposed methods of encoding data on cylinders resides in the impermanent character of the resulting imprint. Due to the need to preserve the integrity of the cylinder itself, it is not possible to drill or otherwise deeply inscribe cylinder data into walls of the pressurized gas cylinders. Inasmuch as cylinders are sometimes handled relatively roughly during transport and use, inscribed cylinder data tends to wear away, or otherwise become damaged or disfigured. As the data becomes faded and less legible, reading the information become more difficult and can result in error.

Another problem which arises from the manner in which data is currently stamped or otherwise inscribed on cylinders is that the resulting markings do not lend themselves to automatic reading. In present practice, an operator must visually read cylinder data. This is time consuming, and can result in error not only due to improper reading, but also due to improper recording of the data.

While protective caps of various forms have been proposed for use with gas cylinders, many do not provide the desired type of protection for cylinder valves, and most do nothing to assist with manual and mechanical handling of the cylinders. Most previously proposed cylinder caps are removable, which means that these caps do not necessarily remain with the same cylinder at all times; hence, it is not feasible to utilize removable caps to provide surfaces on which cylinder data can be deeply inscribed, for serious errors can result if the data-inscribed cap is removed from the cylinder to which its data pertains, and is installed on a different cylinder.

3. The Referenced Applications

The referenced Filling System Case relates to novel and improved methods and apparatus for filling pressurized gas cylinders with acetylene. The present invention may be utilized advantageously in conjunction with the practice of the invention described in the Filling System Case.

The referenced Cooling System Case relates to novel and improved methods and apparatus for cooling selected wall portions of a pressurized gas cylinder as the cylinder is being filled. The invention of the Cooling System Case may be used to fill pressurized gas cylinders which employ the invention of the present application.

SUMMARY OF THE INVENTION

The present invention overcomes the foregoing and other drawbacks of the prior art by providing a fixed protective cap for a pressurized gas cylinder. The cap has essential cylinder data encoded on it in a manner which can be read visually by an operator, or automatically by an inductive transducer.

In accordance with the preferred practice of the present invention, a protective cap for a pressurized gas cylinder includes a ferro-magnetic body having an outer surface which is provided with a linear array of holes arranged to encode cylinder data in binary form. The presence or absence of a hole in each of a plurality of linearly spaced positions indicates one of two logic states. While the presence of a hole in a given position indicates one logic state, the absence of a hole at that position indicates the opposite state. Data is encoded in a repetitive but inverse form in two linear side-by-side rows. The data is read by a dual-head inductive transducer which is moved along the linear array such that each of the heads senses the presence or absence of holes in separate ones of the side-by-side rows to generate two separate trains of electrical pulses which are indicative of the encoded data, with one of the trains of pulses being substantially inverse in form from the other of the trains of pulses. The cap structure includes a base which is configured to be rigidly affixed to a neck of a pressurized gas cylinder, and an upstanding part which protectively shrouds a cylinder valve. The upstanding part also forms a yoke which can be engaged by a crane hook for lifting and moving the cylinder. The yoke preferably carries a knob-like projection which extends axially with respect to the cylinder, and which can be grasped to facilitate one's rolling the cylinder to move it manually from place to place.

One feature of the present invention lies in the provision of a protective cap which enables cylinder data to be deeply encoded thereon in a permanent manner and in a format which can be visually or automatically read. The encoding preferably takes the form of a series of drilled holes which are not susceptible to fading or wearing away, or to other forms of detrimental disfiguration.

Another feature of the invention lies in the provision of a cylinder data reading system which can be utilized in conjunction with a computer-controlled system for automatically refilling gas cylinders. Such a system is described in the referenced Filling System Case.

A further feature of the invention lies in provision of a data-encoded protective cap having a yoke which facilitates both mechanized and manual handling of a pressured gas cylinder. The yoke of the cap is engageable by a crane hook for mechanical cylinder handling, and is provided with a knob-like projection to facilitate manual cylinder handling. A cylinder is preferably moved manually by grasping the knob, tilting the cylinder slightly from the vertical, and rotating the cylinder along on its bottom edge.

BRIEF DESCRIPTION OF THE DRAWINGS

The foregoing and other features of the present invention will be better understood by referring to the description of the preferred embodiment and claims which follow, taken together with the accompanying drawings, wherein:

DESCRIPTION OF THE PREFERRED EMBODIMENT

Figures 1, 2:
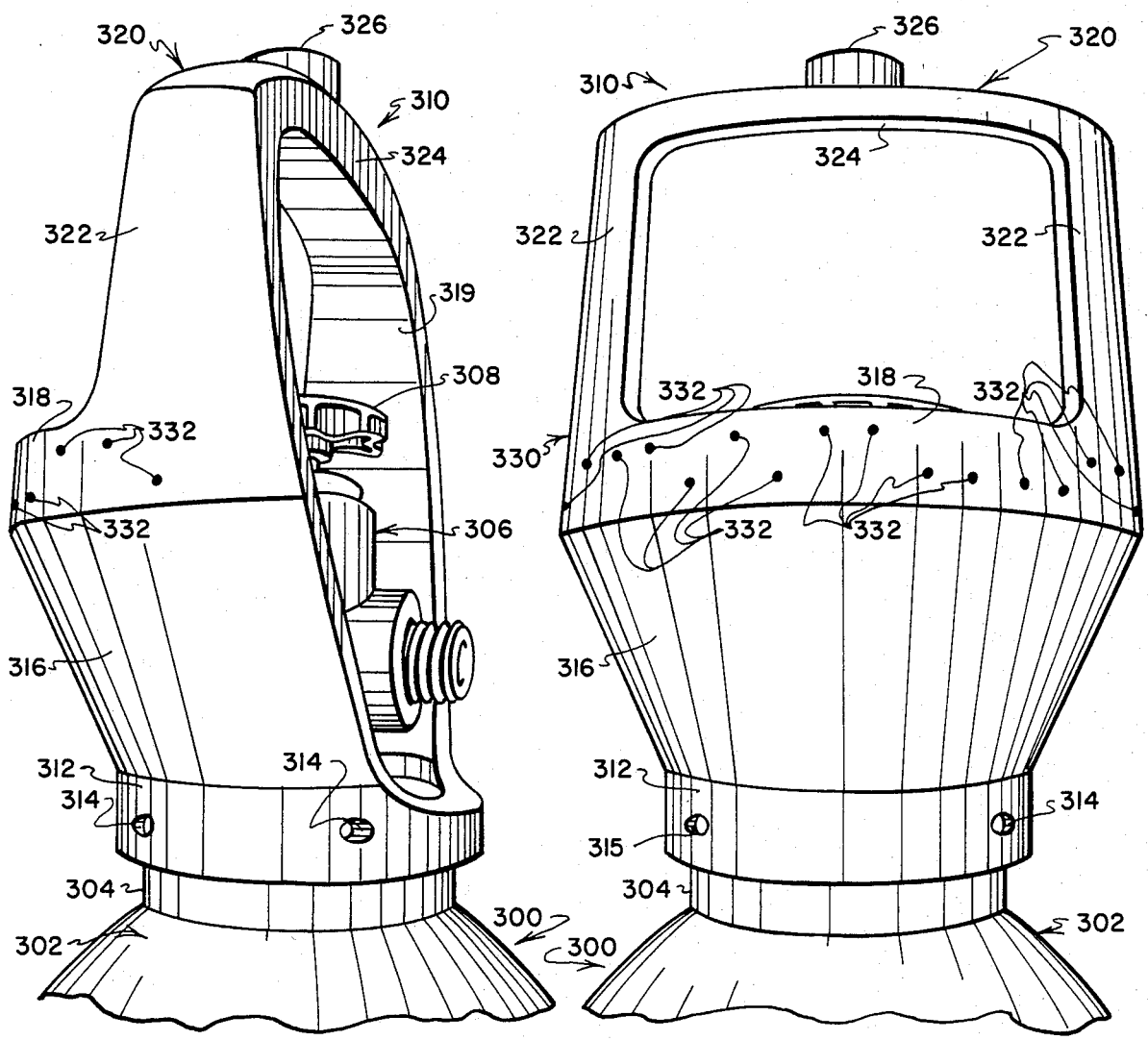
FIG. 1 is a perspective view of a data-encoded cylinder cap embodying the preferred practice of the present invention shown installed on a pressurized a gas cylinder.
FIG. 2 is a side elevational view thereof.

Referring to FIG. 1, a pressurized gas cylinder is indicated generally by the numeral 300. The cylinder 300 has an elongate body 302 formed from steel and having a neck 304 at its upper end. The cylinder 300 carries a valve 306 at its upper end for controlling the flow of material into and out of the body 302. The valve 306 is manually operated by a control knob 308.

In accordance with the present invention, a protective cap 310 is provided atop the cylinder 300. The cap 310 is rigidly fixed to the cylinder's neck 304. The cap 310 includes a base 312, an outwardly projecting protection wall 316, an upstanding portion 318, and a yoke 320. The base 312 is configured to encircle the neck 304 of the cylinder 300. The base 312 defines at least two pairs of aligned holes 314, 315. The holes 314 extend substantially tangentially with respect to opposite sides of the neck 304. Locking pins (not shown) are installed in the holes 314, 315 to engage the neck 304 in such a way that the base 312 is securely affixed to the neck 304, whereby the cap 310 is rigidly mounted on the cylinder 300.

The protective wall 316 cooperates with the upstanding wall 318 to shroud the valve 306. Access to the valve 306 and its control knob 308 is provided by a sidewardly-facing opening 319.

The yoke 320 has a pair of upstanding legs 322 which are connected by a transversely-extending wall 324. The yoke 320 provides a formation which can be engaged by a crane hook for lifting and moving the cylinder 300.

In preferred practice the yoke 320 has a knob-like projection 326 located atop the transverse wall 324. The knob-like projection 326 can be grasped by an operator to facilitate manual relocation of the cylinder. The cylinder 300 can be moved quite easily by grasping the knob 326, tipping the cylinder 300 slightly so that its axis is no longer vertical, and rolling the bottom edge (not shown) of the cylinder 300 along a floor surface while journaling the knob 326 in the palm of one's hand.

The cylinder cap 310 is encoded in binary form with cylinder data. The binary data takes the form of a linear array of drilled holes located at spaced positions 330 on an outer portion of the cap 310. The linear array 330 preferably includes thirty-two spaced locations arranged in two sixteen-position, side-by-side rows or columns. Cylinder data is encoded by drilling or otherwise providing holes 332 in selected ones of the spaced locations 330. The entire array of encoded data typically occupies an area of about 20 mm by about 180 mm.

Figure 3:
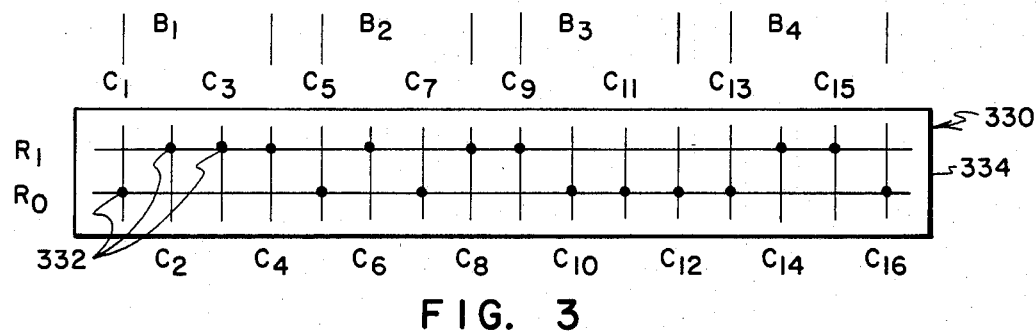
FIG. 3 is a schematic view illustrating a drilling grid utilized to define proper locations for the drilling of holes to encode cylinder data on the cap.
Figure 4:
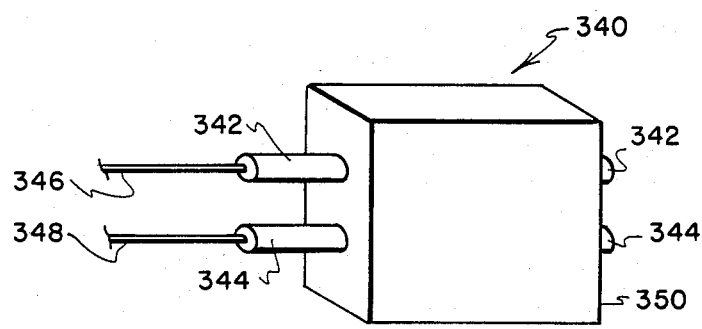
FIG. 4 is a schematic view of a dual-head inductive transducer used to read cylinder data which has been encoded on the cap; and, FIG. 5 is a perspective view of the transducer shown in the process of reading cylinder data encoded on the cap; and, FIG. 6 is a schematic view of a pair of typical signal pulse trains which are generated by the transducer.

In preferred practice, a drilling grid 334 is used to facilitate the drilling of holes 332 at proper locations to form the desired type of linear array 330. Referring to FIG. 3, the drilling grid 334 is shown as including two side-by-side rows labeled R0 and R1, and sixteen side-by-side columns labeled C1–C16. Each of the columns C1–C16 represents one bit of binary data in the form of one hole per column drilled in either row R0 or row R1 to indicate one of two logic states. A hole drilled in row R0 of any column indicates a logic state "0", while a hole drilled in row R1 of any column indicates a logic state "1".

Each group of four successive columns designates one byte of binary data, designated as B1 through B4 in FIG. 3. For example, positions C1–C4 represent byte B1. Likewise, positions C5–C8, C9–C12 and C13–C16 represent bytes B2, B3 and B4, respectively. Each byte of data represents a single-byte data word which can be decoded in base 10 (decimal form) as will be more fully explained.

In the preferred practice of the present invention, the encoded data includes the cylinder type and the tare weight of the cylinder. The cylinder type is encoded in the first byte of data designated B1. The cylinder type code is assigned a value from 1 through 15. To decode the cylinder type encoded on the drilling grid of FIG. 3, reference is made to the first four columns, C1–C4, byte B1. A hole 332 is shown as being present in row R0 of column C1, thereby indicating a logic state "0" for the first bit, C1, of byte B1. For columns C2–C4 a hole 332 is shown as being present in row R1 to indicate a logic state "1" for the last three bits, C2–C4, of byte B1. Byte B1 is therefore decoded as 0111.

Referring to Table 1, the cylinder code corresponding to a byte B1 of the form 0111 is 07. Fifteen different type of cylinder codes are represented in Table 1.

TABLE 1

| Binary representations of cylinder type codes as read from the first byte of data | |
|---|---|
| Binary Byte B1 | Cylinder Type Code |
| 0001 | 01 |
| 0010 | 02 |
| 0011 | 03 |
| 0100 | 04 |
| 0101 | 05 |
| 0110 | 06 |

TABLE 1-continued

| Binary representations of cylinder type codes as read from the first byte of data | |
|---|---|
| Binary Byte B1 | Cylinder Type Code |
| 0111 | 07 |
| 1000 | 08 |
| 1001 | 09 |
| 1010 | 10 |
| 1011 | 11 |
| 1100 | 12 |
| 1101 | 13 |
| 1110 | 14 |
| 1111 | 15 |

Bytes B2–B4 (C5–C16) represent the cylinder's tare weight in kilograms. Byte B2 (C5–C8) represent tens of kilograms, while byte B2 (C9–C12) indicates units of kilograms, and byte B4 (C13–C16) indicates tenths of a kilogram. The cylinder's tare weight may be ascertained by decoding the data of bytes B2–B4 in accordance with the schedule of Table 2. For example, byte B2 of FIG. 3 is read 0101, while byte B3 is read 1000, and byte B4 is read 0110. Referring to Table 2, the decimal equivalent of byte B2 is 5, while the decimal equivalent of byte B3 is 8, and the decimal equivalent of byte B4 is 6. Thus the tar weight indicated by the bytes B2–B4 is 58.6 kilograms.

TABLE 2

| Binary representations of decimal numbers used to indicate calculate cylinder tare weight | |
|---|---|
| Binary Bytes B2–B4 | Tare Numbers |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |

Since cylinder data is encoded on the cap 310 in the form of holes drilled at predetermined locations, the data is not susceptible to scratching and wearing away, and hence provides a permanent inscription that is not subject to misinterpretation.

Figure 5:
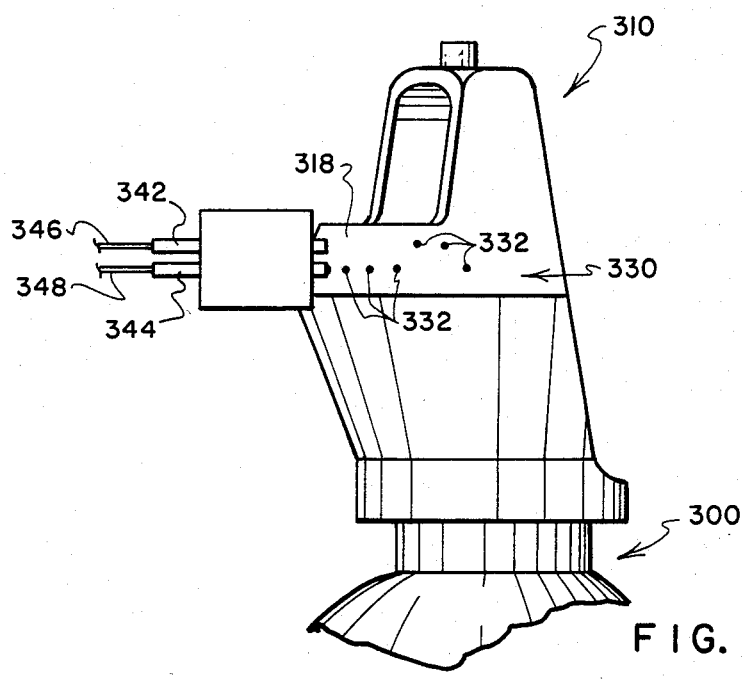
Figure 6:
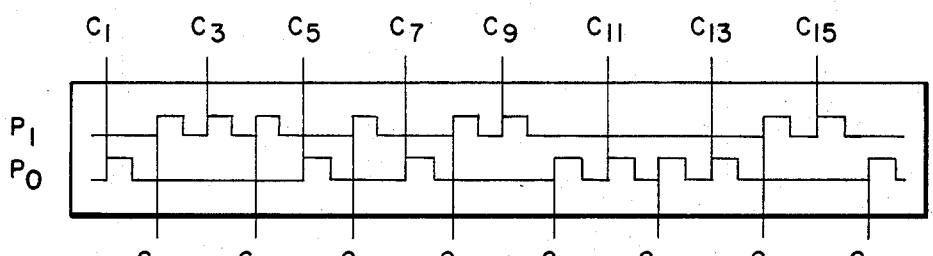

Referring to FIGS. 5 and 6, in the preferred practice of the present invention, the data encoded on the protective cap 310 is read by a dual-head inductive transducer, indicated generally by the numeral 340. The transducer 340 includes a pair of side-by-side sensors 342, 344. The sensors 342, 344 are interfaced and operate to inductively sense the presence or absence of ferro-magnetic material as they are drawn along the tracks of drilled holes formed in the cap 310. Wires 346, 348 connect the sensors 342, 344 with suitable pulse sensing electronics (not shown). A fixture 350 houses portions of the sensors 342, 344 and maintains them at a fixed distance apart so that the sensors 342, 344 are able to simultaneously read both rows R0 and R1 of the linear array of spaced locations 330.

In operation, the transducer 340 is passed from left to right across the portions of the cap 310 having the encoded data. As the transducer 340 scans the encoded area, the sensors 342, 344 detect the presence or absence of holes 332 in rows R0, R1 respectively. Whenever the presence of a hole 332 is detected by one of the sensors 342, 344, the absence of a hole 332 should be detected by the other of the sensors. As the transducer 340 is passed along the linear array 330, each of the sensors 342, 344 produces a series of electrical pulses which are indicative of the presence or absence of holes 332 in the linear array 330. Each of the sensors 342, 344 generates a pulse for each of the holes 332 detected during the scanning operation.

Referring to FIG. 6, pulse trains P0, P1 as are generated by the sensors 342, 344 as the transducer 340 scans the rows R0, R1 from left to right are illustrated. Since only one hole 332 may appear in each of the columns C1–C16 of the linear array 330, only one of the sensors 342, 344 should generate a pulse for any given bit (column) of data. If, for example, while scanning column C1 the sensors 342, 344 simultaneously generate pulses to indicate the presence of more than one hole 332 in this column, the resulting signal will indicate erroneously encoded data or an input error. This method of reading encoded data provides an in-process check for the accuracy of the data reading function.

An additional check can also be made to determine if all the cylinder data has been properly read by adding up the total number of pulses from both pulse trains P0 and P1 and checking it against the total number of bits encoded. To further assure that the data has been read properly a second scan is made by passing the transducer 340 from right to left along the rows R0, R1. The pulse trains obtained from each of the first and second passes are then electronically compared for deviations.

Although the pulse trains P0, P1 are illustrated as comprising a series of square wave pulses, it will be understood that a wide variety of waveforms may be generated which are indicative of the encoded data. It will also be understood that while the dual-head transducer 340 has been described as inductively sensing the presence or absence of a ferro-magnetic material, the transducer may take any of a wide variety of commercially available forms, including an optical sensor which detects the presence of holes by detecting variations in illumination or reflected light as the sensor is passed along the rows R0, R1.

While the term "cylinder" is used throughout this document in referring to such containers as are being filled or refilled with pressurized gas, it will be understood that this term is used simply to comply with the terminology used by those skilled in the art to which the present invention pertains. The term "cylinder" is not to be construed as being limiting, and applies with equal propriety to all forms of containers which are suitable for use with a particular pressurized gas.

Although the invention has been described in its preferred form with a certain degree of particularity, it is understood that the present disclosure of the preferred form has been made only by way of example and numerous changes in the details of construction and combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:
1. A cylinder data encoding device, comprising:
 (a) structure non-removably secured to a pressurized gas cylinder for providing a relatively smooth data encoding surface;
 (b) the structure also defining surface discontinuity means including an array of surface discontinuities formed in the surface at selected locations thereon to encode cylinder data;

(c) the surface discontinuities including an array of formations that extend substantially perpendicular to adjacent portions of the smooth surface to provide an encoded presentation of cylinder data that can be understood through interpreting the encoded presentation; and, (d) the surface discontinuities taking the form of a linear array of surface discontinuities arranged in two side-by-side rows including a plurality of columns, with only one surface discontinuity being provided in each of the columns, whereby a surface discontinuity provided in a selected one of the two rows indicates one of two logic states, and a surface discontinuity provided in the other of the rows indicates the opposite logic state.

2. The device of claim 1 wherein the structure is formed of a ferro-magnetic material, and the surface discontinuities are detectable by monitoring changes in a magnetic field that is passed along the surface.

3. Device comprising:
(a) structure non-removably secured to a pressurized gas cylinder for providing a data encoding surface;
(b) surface discontinuity means including an array of surface discontinuities formed in the surface at selected locations thereon to encode cylinder data; and,
(c) the surface discontinuities taking the form of holes drilled in the surface.

4. The device of claim 3 wherein the encoded cylinder data includes a cylinder type code and a tare weight code.

5. The device of claim 3 wherein the encoded cylinder data is encoded in binary form.

6. A cylinder data encoding device, comprising:
(a) structure non-removably secured to a pressurized gas cylinder for providing a data encoding surface;
(b) surface discontinuity means including an array of surface discontinuities formed in the surface at selected locations thereon to encode cylinder data;
(c) the data being encoded in binary form; and,
(d) the surface discontinuities taking the form of a linear array of surface discontinuities arranged in two side-by-side rows including a plurality of columns, with only one surface discontinuity being provided in each of the columns, whereby a surface discontinuity provided in a selected one of the two rows indicates one of two logic states, and a surface discontinuity provided in the other of the rows indicates the opposite logic state.

7. The device of claim 6 wherein sixteen of said columns are provided to encode sixteen bits of binary data.

8. A cylinder data encoding device, comprising:
(a) structure non-removably secured to a pressurized gas cylinder for providing a data encoding surface;
(b) surface discontinuity means including an array of surface discontinuities formed in the surface at selected locations thereon to encode cylinder data;
(c) the structure including a cap for protectively shrouding at least a portion of a cylinder valve, the cap including:
  (i) a base which is fixed to the cylinder; and,
  (ii) an upper portion which defines a lifting yoke; and,
(d) the surface discontinuities taking the form of a linear array of surface discontinuities arranged in two side-by-side rows including a plurality of columns, with only one surface discontinuity being provided in each of the columns, whereby a surface discontinuity provided in a selected one of the two rows indicates one of two logic states, and a surface discontinuity provided in the other of the rows indicates the opposite logic state.

9. The device of claim 8 wherein the yoke is provided with a knob-like projection which can be journaled in one's hand to facilitate manual relocation of the cylinder by rolling.

10. The device of claim 8 wherein the base is fixed to the cylinder by a pair of pins which extend through holes formed in the base and engage a neck portion of the cylinder on opposite sides thereof.

11. A cap for a pressurized gas cylinder, comprising:
(a) means including structure for being rigidly secured to a neck of a pressurized gas cylinder, for protectively enclosing at least a portion of a valve attached to the cylinder, and for providing a data encoding surface; and,
(b) an array of formations including a series of holes formed in the surface at selected locations to encode cylinder data thereon in binary form.

12. The cap of claim 11 wherein the structure is formed from a ferro-magnetic material.

13. The cap of claim 11 wherein the encoded data includes a cylinder type code and tare weight code.

14. The cap of claim 11 wherein the selected locations define a linear array of spaced locations and are arranged in two side-by-side rows including a plurality of columns, with only one hole being provided in each of the columns, whereby a hole provided in a selected one of the two rows indicates one of two logic states, and a hole provided in the other one of the rows indicates the opposite logic state.

15. The cap of claim 11 wherein the structure includes:
(a) a base which is fixed to the neck of the cylinder; and,
(b) an upper portion which defines a lifting yoke.

16. The cap of claim 15 wherein the yoke is provided with a knob-like projection which can be grasped to facilitate manual rolling of the cylinder from place to place.

17. The cap of claim 15 wherein the base is fixed to the neck of the cylinder by a pair of pins which extend through holes formed in the base and which engage opposite side portions of the neck of the cylinder.

18. The cap of claim 14 wherein one hole is provided for each column in a selected one of the two rows to designate one of two logic states.

19. The cap of claim 11 wherein the array includes one row and a plurality of columns, with each column defining one byte of binary data.

20. The cap of claim 19 wherein the presence of a hole in a selected one of the columns indicates one of two logic states while the absence of a hole in a selected column represents the opposite logic state.

21. A method of encoding a cap for a gas cylinder, comprising the steps of:
(a) providing a cap structure having an outer surface; and,
(b) defining a linear array of spaced locations on the outer surface; and,
(c) drilling a plurality of holes at selected ones of the spaced locations to encode cylinder data on the outer surface in binary form.

22. The method of claim 21 wherein the step of providing a cap structure includes providing a cap structure made from a ferro-magnetic material.

23. The method of claim 21 wherein the step of defining a linear array includes providing an array having two side-by-side rows defining a plurality of side-by-side columns.

24. A method of reading data encoded on the cap of a gas cylinder, comprising the steps of:
 (a) providing a cap structure defining a linear array of spaced locations with a plurality of holes being provided at selected ones of the locations to encode cylinder data in binary form thereon;
 (b) providing a sensing means for detecting the presence or absence of the holes; and,
 (c) scanning the linear array with the sensing means to determine the positions of the holes within the array and to generate a series of electrical pulses in response to the presence of each hole sensed in the linear array.

25. The method of claim 24 wherein the step of providing a cap structure includes providing a cap structure formed from ferro-magnetic material, and the step of scanning the array is preformed using an inductive transducer for detecting the presence or absence of holes formed in the ferro-magnetic material.

26. The method of claim 24 wherein the step of providing an array includes the step of providing holes at spaced locations in two side-by-side rows defining side-by-side columns, and the step of determining the positions of the holes within the array includes the step of comparing the data obtained from each of two sensors passed simultaneously along the rows, and checking to see that only one of the sensors detects the presence of a hole for any given column.

27. The method of claim 26 wherein the step of scanning the linear array includes making two independent passes over the linear array, comparing the data obtained from each pass, and checking for inconsistent readings.

28. The method of claim 26 wherein the step of scanning includes the step of comparing the number of holes sensed with the number of columns encoded to ascertain that all of the data has been read.

* * * * *